No. 632,743. Patented Sept. 12, 1899.
E. PETRÉANO.
REVERSING GEAR FOR GAS OR PETROLEUM ENGINES.
(Application filed Nov. 8, 1897.)
(No Model.) 2 Sheets—Sheet 2.
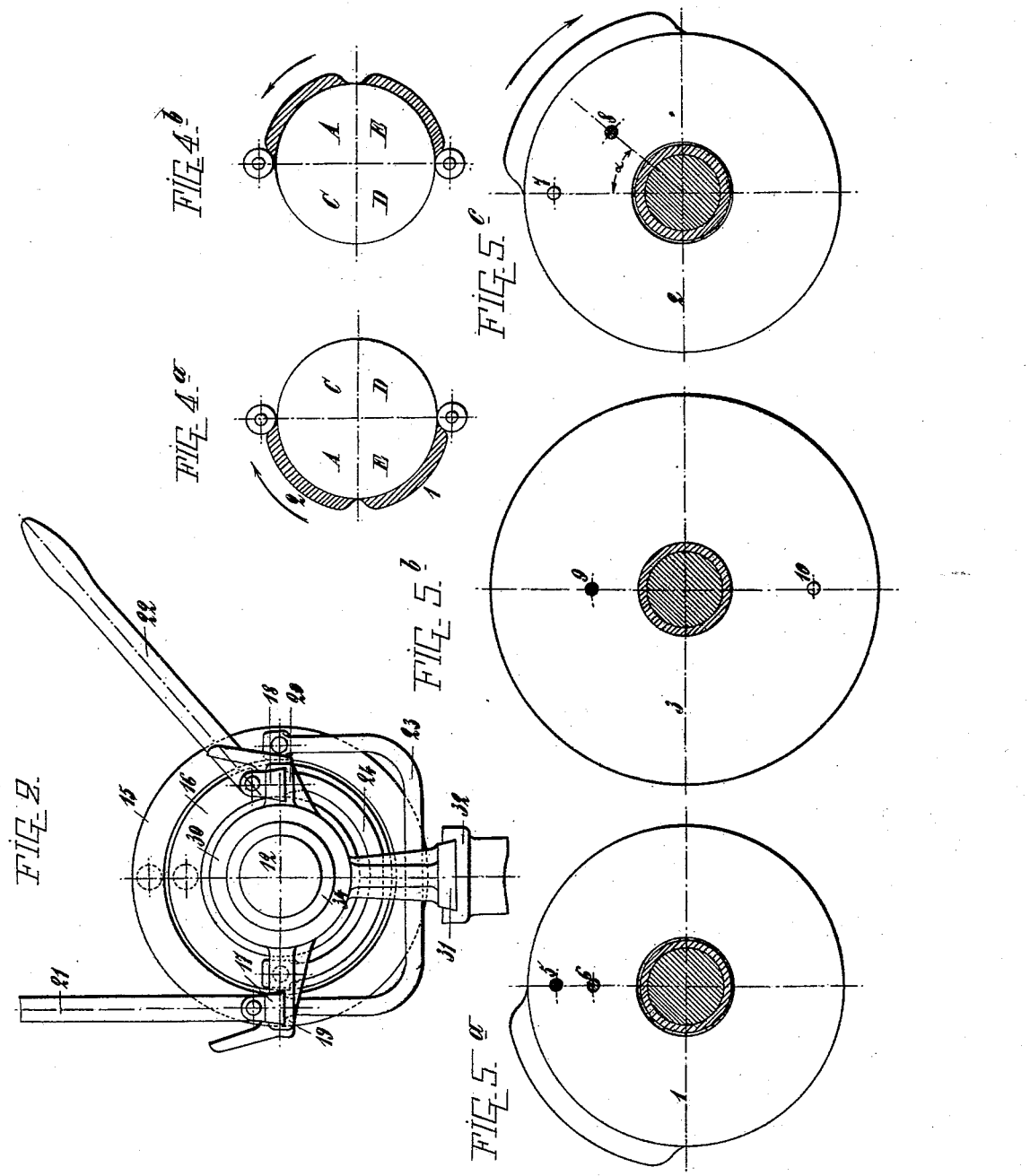
WITNESSES:
INVENTOR
BY
ATTORNEYS.

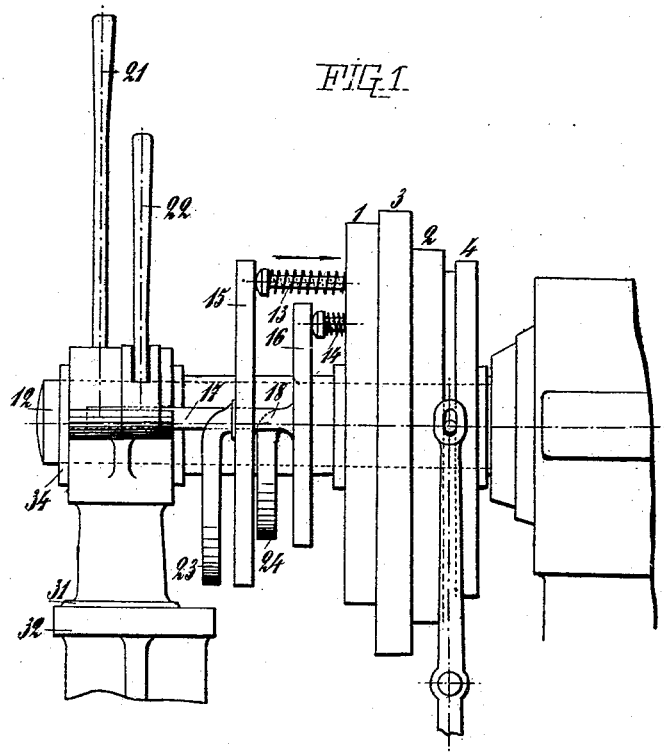

UNITED STATES PATENT OFFICE.

ETIENNE PETRÉANO, OF PARIS, FRANCE.

REVERSING-GEAR FOR GAS OR PETROLEUM ENGINES.

SPECIFICATION forming part of Letters Patent No. 632,743, dated September 12, 1899.

Application filed November 8, 1897. Serial No. 657,879. (No model.)

*To all whom it may concern:*

Be it known that I, ETIENNE PETRÉANO, of Paris, France, have invented certain new and useful Improvements in Reversing-Gear for Gas or Petroleum Engines, which improvements are fully described in the following specification, and for which I have obtained in France a patent of addition to Patent No. 262,410, dated May 20, 1897.
In a contemporaneous application (Serial No. 657,878) I have described a new gas-engine worked with previously-produced intimate mixture and capable of being converted into a petroleum, alcohol, &c., engine, and of which one characteristic feature was constituted by the mode of its regulation. As I therein stated, that mode of regulation consisted, essentially, in acting by means of the governor by the admission of a variable volume of previously-produced explosive mixture, but with constant compression produced by regulating by means of the governor not only the admission-valve, but also the exhaust-valve. By means of suitable cams when the normal speed of the engine increases the governor closes the admission and opens the exhaust—for example, during a fifth part of the suction-stroke of the piston—then the exhaust closes, and at that instant the admission-valve of the previously-produced mixture opens during the four other fifths of the piston-stroke in such a manner as to fill the remaining space with the previously-produced mixture, after which the admission-valve closes. If for any reason the speed of the engine exceeds the maximum limit, the governor stops the admission of the mixture completely and opens the exhaust completely. It will be understood that with this mode of regulation, whatever the charge, (empty, fourth, half, three-fourths, full,) the speed of the engine remains constant, because it is regulated by the governor.

The present application for a patent has for its object to secure the exclusive right in certain improvements in that mode of regulation with the object of passing instantaneously and very easily from forward motion to backward motion, and vice versa. I effect this reversal of motion by simply making the cams which operate the rollers of the valves movable, all the other parts remaining fixed, and serving indiscriminately in the same conditions for forward motion and backward motion. The cams will be simply shifted, but they will serve in both directions of motion for actuating the rollers of the valves.

In four-stroke cycle engines it is well known that the four strokes, starting from the dead-center, are the following: first, admission; second, compression; third, explosion and expansion; fourth, exhaust. In consequence of the improvements which I have made in my mode of regulation and by the simple shifting of the cams, as above stated, I am able to retain the four strokes or phases and the same order of the same for forward motion as also for backward motion.

With my new system the regulating-shaft, the governor, the rollers, and the levers which operate the rollers of the admission and exhaust valves, as also the cams, serve in both cases for forward motion and backward motion. I therefore do not add any part and I do not take any part away. They all retain the same respective positions in the two directions of motion, except the cams, which I shift slightly, which constitutes the only operation to be done in order to reverse the direction of motion, which operation by reason of its simplicity can be effected by any workman almost instantly.

In order to render the following explanations as clear as possible, I have illustrated, by way of example, on the annexed drawings a construction which I have devised with the object of causing the engine to run in both directions under the conditions above stated.

Figure 1 is an elevation of the cam-shaft. Fig. 2 is an end view of the same. Fig. 3 is a vertical longitudinal section through the said shaft. Fig. 4$^a$ shows the positions of the cams 1 and 2 for forward motion. Fig. 4$^b$ shows the position of the same cams for backward motion. Fig. 5$^a$ is a front elevation of cam 1 or exhaust-cam, which is formed with two holes 5 and 6, the use of which will be explained later on. Fig. 5$^b$ is a front elevation of the disk 3, which is formed with two holes 9 and 10, the purpose of which will be explained later on. Fig. 5$^c$ is a front elevation of the admission-cam 2, formed with two holes 7 and 8, the purpose of which will be explained later on.

The cams 1 and 2 are loosely mounted on a sleeve 11, which surrounds and rotates with shaft 12, but is free to move lengthwise thereof for the purpose hereinafter explained. Disks 3 and 4 are rigidly attached to said sleeve. Cams 1 and 2 are connected with disk 3 by means of pins 13 and 14, so as to occupy either of two positions. The pin 13 engages constantly with the hole 5, formed in the cam 1. If by reason of the rotation of the disk 3 the hole 10, formed in the said cam, comes opposite to the rear end of the hole 5, the pin 13 will be able to enter therein and rigidly connect the cam 1 with the disk 3; but at that moment, by reason of the stoppage of the cam 2, which does not rotate and which is held by its roller, the hole 7, formed in said cam 2, will be situated behind the hole 10, so that the pin 13 will connect the cams 1 and 2 at the same time rigidly to the disk 3. As we shall perceive hereinafter, this position will give us a position of the cams 1 and 2 for one direction of motion.

What we have just stated respecting the pin 13 is equally applicable to the pin 14, which is adapted to enter the holes 6, 9, and 8, formed, respectively, in the parts 1, 3, and 2. When the pin 14 is engaged with these three holes, we shall obtain for the cams 1 and 2 a new position which will correspond to the other direction of motion.

We shall now proceed to explain how the insertion of the pin in the several holes above referred to can be effected. Each of these pins is subjected to the action of a spring, which tends to cause them to move out of the holes formed in the cams, and consequently to press them against the rings 15 and 16. These rings 15 and 16, which completely surround the sleeve 11 without bearing upon it in any way, are carried by slides 17 and 18, which are capable of being moved in lateral slideways 19 and 20, arranged on each side of the apparatus. The slide 17, carrying the ring 15, is provided with a handle 21, which allows the driver of the engine to move the slide 17 forward or backward to a greater or less extent in such a manner as to move the ring 15 more or less toward the first cam. The slide 18, carrying the ring 16, has a similar handle 22, which allows of acting on the slide 18 in order to move the ring 16 nearer to the cam 1. The approach of the ring 15 toward the cam 1 has for result, as will be understood on inspecting Fig. 1, to push the pin 13 in the direction of the arrow, and said pin will enter the holes above referred to if the latter are at that moment opposite to one another. Similarly the approach of the ring 16 toward the cam 1 has for result to insert the pin 14 into the holes above referred to if the latter are similarly opposite to one another. In order to keep the rings 15 and 16 stationary in the desired positions, the handles 21 and 22 are capable of being turned down, as shown in Fig. 2, into notches formed in the edges of the slideways, in which the slides move. In order that the movement of the slides shall produce the movements of the rings 15 and 16 at right angles to the shaft, we connect each slide at two diametrically opposite points of the corresponding ring by means of bars, one, 23, of which for the bolt 19 is doubly bent and the other, 24, for the slide 18 forms an arc of a circle, as shown in Fig. 2.

The insertion of one of the two pins 13 and 14 into the holes of the parts 1 3 2 produces motion in one definite direction. From this it follows that it is indispensable that the two pins shall not be capable of being inserted at one and the same time; otherwise they would not produce the desired result. This simultaneous insertion of the two pins is rendered impossible by the position of the holes formed in the several cams and by the different distances of said pins from the axis of the shaft 12. Thus if we examine Figs. 5$^a$, 5$^b$, and 5$^c$ we shall see that if the holes 5, 10, and 7 are opposite to one another the hole 9 will be diametrically opposite to the hole 6, and the radius passing through the hole 8 will make an angle with the radius passing through the hole 6. It will thus be seen that if the pin 13 enters the holes 5, 10, and 7 the pin 14 will only be able to enter the hole 6 and will not produce any result and will be simply carried around by the rotary movement of the cam 1. It is understood that in the operation of engines of this type it is necessary that the cams and connected parts should be capable as an entirety of motion lengthwise of the shaft in response to the action of the governor. In order that the cams and operating mechanism described may partake of this motion without opposing much resistance thereto, the slideways 19 and 20, which support the slides 17 and 18, are attached to the opposite sides, respectively, of the bearing 30, in which sleeve 11 rotates, and said bearing 30 is mounted on a base 31, capable of sliding lengthwise of sleeve 11 in a slideway 32. Sleeve 11 has collars 33 34, which embrace bearing 30, so that the latter partakes of any movement of said sleeve lengthwise of shaft 12.

Having now explained one construction wherein the present invention is embodied, I will now explain the operation thereof, and to render the explanation as complete as possible will consider the two cases which arise in practice—namely, first, starting in any direction when the engine is stopped, and, second, reversing the engine while it is running.

I. *Starting the engine in any direction when the engine is stopped.*—Assuming that the engine is stopped and we wish to start it again in the forward direction, (diagram Fig. 4$^a$,) and also assuming that the two pins 13 and 14 are entirely pushed to the left—that is, they only engage, respectively, with the holes 5 and 6 of disk 1—the holes 9 and 10, formed in cam 3, not being opposite to the holes 5 and 6. One of the workmen acts upon the lever 21 in such a manner as to press by means of the bolt 17 and the ring 15 upon the head of the pin 13. During this time another workman turns the fly-wheel of the engine so as to bring it back to its starting-point. In this rotary movement imparted to the fly-wheel the cam in one piece, with the sleeve 11, rotates, and at the moment that the hole 10 comes behind the hole 5 the pin 13 will enter the hole 10 by reason of the pressure exerted by the first workman upon the bolt 17. Under the action of this pressure the pin will also enter the hole 7 in the cam 2, when by reason of the rotation of the cam 1 and disk 3 the pin 13 comes opposite the hole 7. We may here state that this coincidence will be capable of being produced, if not at the first revolution, at least and certainly at the second revolution, because the cam 2, held by the roller, cannot rotate. The pin 13 will thus be pushed right into the three holes 5, 10, and 7 and the parts will be ready for forward running, which will take place at once, the cams and disk acting as if they were all keyed on the sleeve. We thus carry out the diagram shown in Fig. 4$^a$.

Let us now consider the case where the engine is stopped and it is desired to produce backward travel. Under these conditions we perform with the pin 14 and the holes 6, 9, and 8 the same operations that we have just made with the pin 13 and the holes 5, 10, and 7, and we then obtain the diagram shown in Fig. 4$^b$, which is a diagram of the position of the cams for backward motion.

II. *Reversing the direction of motion while the engine is running.*—Assuming that the engine is running in the forward direction, the pin 13, connecting the cams 1 and 2 with the disk 3, let us see what are the operations we must effect in order to produce the reversal of motion. At the moment when this reversal is to be effected we act upon the handle 21 in such a manner as to move back the bolt 17, and consequently cause the pin 13 to move out of the holes in the cams and disk. At this moment the cams 1 and 2 become loose, because they are no longer carried along by the disk 3. They therefore act no longer upon the rollers and there is no longer any admission or exhaust. The piston therefore runs in a vacuum and the speed of the engine diminishes very rapidly. When this speed has become sufficiently low to allow of ascertaining the phases or strokes of the engine, the lever 21 is operated in such a manner as to cause the pin 13 to reënter the holes 5, 10, and 7, and this insertion must be very rapid and must last only during the time necessary to produce an admission. When this is done, the pin 13 is brought back sharply away from the cam 2. As the speed of the engine is low, the explosion which will be produced will be an advanced explosion and the engine will suddenly reverse its direction of motion. In order that the following explosions shall be produced in the desired direction of motion, it is necessary that as soon as the pin has been withdrawn for the second time by acting upon the handle 21 the handle 22 must be pushed so as to press upon the pin 14, which will enter the holes as soon as the latter have come opposite one another by reason of the reversal of the direction of motion. The explosions will be produced in a regular manner, and the reversal will be effected. We would have to execute the same operations, but in the opposite order, if it is required to pass from backward travel to forward travel.

For greater security when the reversal of motion is effected while the engine is running we open wide the cock that establishes communication with the explosion-chamber and the atmosphere, as this opening of the cock facilitates the reversal of the engine.

I claim—

1. In an explosion-engine, the combination of the admission-cam and the exhaust-cam, loosely mounted on a shaft adjacent to a disk fixed on said shaft, means for rotating said cams on said shaft to different angular positions, and means common to both cams for fixing them to said disk in the positions corresponding to forward and backward movements respectively, as set forth.

2. In an explosion-engine, the combination of the admission-cam and the exhaust-cam, loosely mounted on a shaft adjacent to a disk fixed on said shaft, said cams and disk being provided with two series of perforations, one series being brought into registration in one position of the cams and disk, and the other series in another position, and locking-pins common to both cams for securing said parts together in either of the two working positions, substantially as described.

3. The combination with the admission and exhaust cams loosely mounted on their shaft and capable of being moved to different angular positions, and reversing mechanism for shifting said cams and fixing them in their respective working positions, said cams and reversing mechanism being movable longitudinally as an entirety in response to the action of the governor.

In testimony whereof I have signed this specification in the presence of two subscribing witnesses.

ETIENNE PETRÉANO.

Witnesses:
 EDWARD P. MACLEAN,
 ANTOINE ROUSSANNES.